United States Patent [19]

Ozawa et al.

[11] Patent Number: 4,502,089

[45] Date of Patent: Feb. 26, 1985

[54] LIGHTNING ARRESTER

[75] Inventors: Jun Ozawa; Katuji Shindo; Shingo Shirakawa, all of Hitachi, Japan

[73] Assignee: Hitachi, Ltd., Tokyo, Japan

[21] Appl. No.: 484,893

[22] Filed: Apr. 14, 1983

[30] Foreign Application Priority Data

Apr. 24, 1982 [JP] Japan .................................. 57-68047

[51] Int. Cl.[3] .............................................. H02H 9/04

[52] U.S. Cl. ..................................... 361/127; 361/117

[58] Field of Search ............... 361/127, 126, 117, 128, 361/130, 129; 315/36

[56] References Cited

U.S. PATENT DOCUMENTS 3,412,273 11/1968 Kennon et al. ................ 361/127 X 4,262,318 4/1981 Shirakawa et al. ................ 361/127

4,326,232 4/1982 Nishiwaki et al. ................. 361/127

4,363,069 12/1982 Crucius et al. ...................... 361/130

*Primary Examiner*—Patrick R. Salce

*Attorney, Agent, or Firm*—Antonelli, Terry & Wands

[57] ABSTRACT

A lightning arrester comprises a plurality of column blocks disposed in parallel each of which has groups of a number of stacked nonlinear resistance elements and spacers interposed between the element groups, in which the element groups of the blocks are electrically connected in series by jumper conductors so as to form a series resistance and the spacers are formed of nonlinear resistance elements which can absorb energy, so that the arrester, as a whole, can absorb a larger amount of energy.

3 Claims, 4 Drawing Figures

LIGHTNING ARRESTER

This invention relates to a lightning arrester, and more particularly to a lightning arrester having no series gap and utilizing, as characteristic elements, nonlinear resistance elements containing, as a main component, zinc oxide.

The lightning arrester is known as a protective device for an electric power system, and now a lightning arrester with no gap, or a so-called gapless lightning arrester is widely used. The lightning arrester of this kind, as disclosed, for example, in U.S. Pat. No. 4,262,318, is formed of a plurality of stacked nonlinear sheet resistance elements as its characteristic elements. Thus, for a high-voltage poer system, a large number of stacked nonlinear sheet resistance elements must be used, resulting in a size of great height.

To avoid this, a system is employed, as disclosed in Japanese patent pre-examination publications KOKAI Nos. 91360/78, 115279/80 and 164502/81, in which a plurality of blocks of stacked nonlinear resistance elements are disposed in parallel and the resistance elements are electrically connected in series in spiral shape by jumper conductors.

In this system, the total height of the arrester can be reduced by properly selecting the number of blocks.

On the other hand, in order to permit the electrical connection mentioned above, it is necessary to provide insulating spacers at selected positions in each block. This insulating spacer is made of epoxy resin. Since each insulating spacer has a considerable thickness in the direction in which the elements are stacked, the spacers affect adversely the attempt to reduce the height of the arrester. Thus, it is desired to overcome this problem.

An object of this invention is to provide a lightning arrester of small size capable of absorbing a large amount of energy.

According to this invention, there is provided a lightning arrester in which the insulating spacers used for providing electrical connection between the blocks are formed of nonlinear resistance elements having large thermal conductivity, thermal capacity and dielectric constant. These nonlinear resistance elements are made of a sintered substance containing, as a main component, zinc oxide similar to the characteristic elements.

According to a preferred embodiment of this invention, the voltage-current characteristics of the resistance element used for the insulating spacer and the characteristic element are so selected that the specific resistance of the element of the insulating spacer is larger than that of the characteristic element and the discharge voltage of the former element is higher than that of the latter element. Therefore, the energy due to a switching surge can be absorbed not only by the characteristic elements but also by the elements of the insulating spacers, the lightning arrester being capable of absorbing a large amount of energy.

The invention will be well understood from the following description with reference to the accompanying draiwngs, in which.

Figure 1:
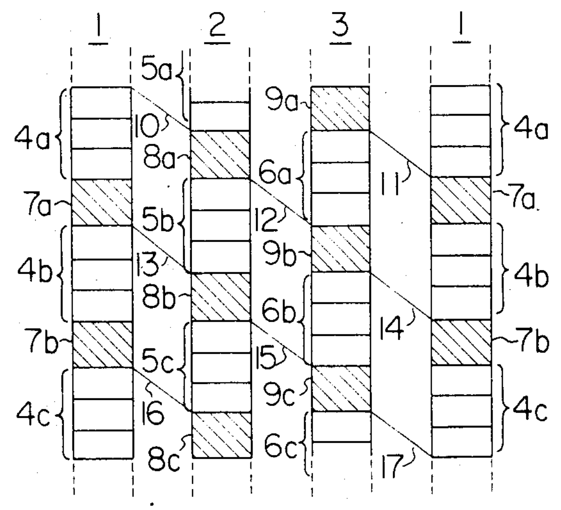
FIG. 1 is a development showing an arrangement of a main portion of the characteristic elements of a lightning arrester of the invention.

With reference to FIG. 1, there is shown an arrangement of three column-like blocks or stacks of characteristic elements in a view of development. For convenience of explanation, one block or stack 1 is repeatedly shown on both sides in FIG. 1. The block 1 is formed of stacked groups or resistor units 4*a*, 4*b* and 4*c* of nonlinear resistance elements each made of a sintered substance containing, as a main component, zinc oxide, and spacers 7*a* and 7*b* disposed between the adjacent groups or resistor units. Each group of elements is formed of three stacked nonlinear resistance elements.

The blocks 2 and 3 are formed in the same way as the block 1. The lower end of the element group 5*a* is connected to the upper end of the element group 4*a* by a jumper conductor 10, and the lower end of the element group 4*a* to the upper end of the element group 6*a* by a jumper conductor 11. Moreover, the lower end of the element group 6*a* is connected to the upper end of the element group 5*b* by a jumper conductor 12, and the lower end of the element group 5*b* to the upper end of the element group 4*b* by a jumper conductor 13. The other jumper conductors 14 to 17 connect other groups similarly.

In this way, the element groups of the blocks are electrically connected in series so as to provide a predetermined resistance characteristic.

The spacers 8*a*, 8*b* and 8*c* of the block 2 and spacers 9*a*, 9*b* and 9*c* of the block 3 are made of the same material as the spacers 7*a* and 7*b* of the block 1, to provide nonlinear resistance elements with large thermal conductivity, thermal capacity and dielectric constant preferably in the order of 0.01–0.5 Watt/cm·°C., 1–5 Joul/°C.·$cm^3$ and 1000–5000, respectively. Such a nonlinear resistance element can be made of a sintered substance containing, as a main component for example, zinc oxide. The nonlinear resistances of the spacers are hereinafter termed added nonlinear resistances.

Figure 4:
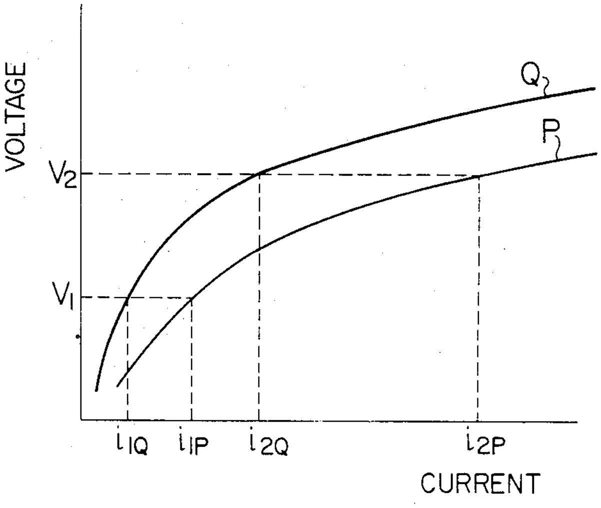
FIG. 4 shows voltage-current characteristic curves of two types of nonlinear resistance elements used in the embodiment of FIG. 1.

The difference between the characteristic element and the added nonlinear resistance will be described with respect to the spacer 7*a* as a typical example. The series connection of element groups 5*b* and 6*a* is electrically connected in parallel with the spacer 7*a*. The thickness of the spacer 7*a* is smaller than the total thickness of the element groups 5*b* and 6*a*. The maximum energy which the spacer 7*a* can absorb is smaller than the maximum total energy which both the element groups 5*b* and 6*a* can absorb. The specific resistance of the spacer 7*a* is larger than the resultant specific resistance of groups 5*b* and 6*a*. The voltage-current characteristics of the spacer and element groups are shown in FIG. 4. The discharge voltage of the spacer 7*a* as shown by curve Q is so selected as to be about 10% higher than the total discharge voltage of a series circuit of resistor units or element groups 5*b* and 6*a* as shown by curve P.

Figure 2:
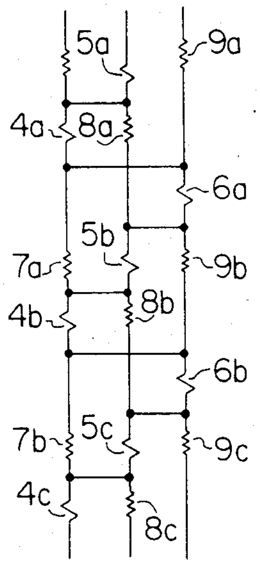
FIGS. 2 and 3 are equivalent circuit diagrams of the arrangement of FIG. 1.
Figure 3:
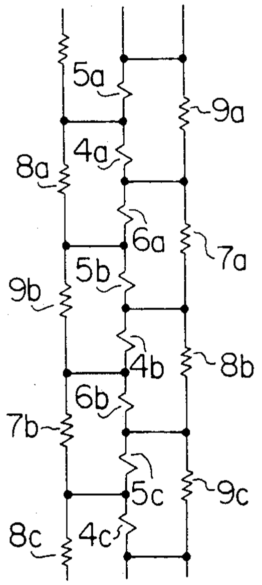

The equivalent circuit of the zinc-oxide type lightning arrester shown in FIG. 2 can be further rewritten, for easy of understanding, into another equivalent circuit in FIG. 3.

From FIG. 3 it will be seen that the equivalent nonlinear resistances $R_{7a}$, $R_{7b}$, $R_{8a}$, $R_{8b}$, $R_{8c}$, $R_{9a}$, $R_{9b}$ and $R_{9c}$ of the spacers 7*a*, 7*b*, 8*a*, 8*b*, 8*c*, 9*a*, 9*b* and 9*c*, which were not used so far, are added in parallel to the equivalent nonlinear resistances $R_{4a}$, $R_{4b}$, $R_{4c}$, $R_{5a}$, $R_{5b}$, $R_{5c}$, $R_{6a}$, $R_{6b}$ and $R_{6c}$ of the resistor units or element groups 4*a*, 4*b*, 4*c*, 5*a*, 5*b*, 5*c*, 6*a*, 6*b* and 6*c*. Therefore, this lightning arrester of the same size as that of the conventional one is able to absorb larger energy than the conventional one by an amount absorbed by the added nonlinear resistance thereby to decrease the discharge voltage at a nominal discharge current.

In the normal state in which a rated voltage $V_1$ is applied, the current $i_{1Q}$ flowing through the added nonlinear resistance is much smaller than the current $i_p$ flowing through the characteristic element. When a switching surge where a higher voltage $V_2$ is applied occurs and a large energy must be absorbed, the currents flowing through the added nonlinear resistance and characteristic element are respectively shifted to $i_{2Q}$ and $i_{2P}$. Therefore, this arrester is able to absorb a larger energy than the conventional one by an amount corresponding to the current thereby to decrease the discharge voltage at a nominal discharge current.

When a large energy is absorbed, it is desired, in view of service life and tolerable amount of energy that the ratio between the currents $i_{2P}$ flowing through the characteristic element and the current $i_{2Q}$ flowing through the added nonlinear resistance be almost approximately equal to the ratio between their volumes, or the ratio between their thicknesses and that the energy per unit volume absorbed by the characteristic element is the same as that by the added nonlinear resistance.

Also, since the spacers *7a*, *7b* and so on have large thermal conductivity and thermal capacity as compared with the conventional insulating spacers, the arrester of the invention has, as a whole, large thermal conductivity and thermal capacity resulting in small size. In addition, the spacers have large dielectric constant and hence large capacitance, which is effective to provide uniform potential distribution among the element groups connected in series.

While in the above embodiment three cylindrical blocks are disposed in parallel, this invention can use two, four or more blocks in parallel. Moreover, the nonlinear resistance elements forming spacers are not limited to the above zinc oxide elements, but may be elements of other materials having large thermal conductivity, thermal capacity and dielectric constant.

What is claimed is:

1. A lightning arrester comprising a plurality of stacks of resistor units made of a first nonlinear resistance material and spacer units made of a second nonlinear resistance material providing a substantially continuous voltage-current characteristic and having a specific resistance value greater than that of the first nonlinear resistance material of said resistor units, said spacer units being disposed between every two adjacent resistor units in each stack, and means for electrically connecting in series resistor units alternately selected from the respective stacks such that every two adjacent series-connected resistor units are connected in parallel with one of said spacer units.

2. A lightning arrester according to claim 1, wherein each of said resistor units includes a plurality of resistor elements.

3. A lightning arrester according to claim 1, wherein any one of said spacer units is selected to have a voltage-current characteristic to provide a discharge voltage higher than a discharge voltage of the resistor units connected in parallel with said one spacer unit.

* * * * *